(12) United States Patent  
Dufford

(10) Patent No.: US 9,266,529 B2  
(45) Date of Patent: Feb. 23, 2016

(54) KNOWN ROUTE HV CONTROL COMPENSATION

(71) Applicant: Toyota Motor Engineering & Manufacturing North America, Inc., Erlanger, KY (US)

(72) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/786,160

(22) Filed: Mar. 5, 2013

(65) Prior Publication Data

US 2014/0257608 A1  Sep. 11, 2014

(51) Int. Cl.  
*B60W 20/00* (2006.01)  
*B60W 10/06* (2006.01)

(52) U.S. Cl.  
CPC ............. *B60W 20/104* (2013.01); *B60W 10/06* (2013.01); *B60W 2510/244* (2013.01); *B60W 2530/14* (2013.01); *Y02T 10/6286* (2013.01); *Y10S 903/93* (2013.01)

(58) Field of Classification Search  
None  
See application file for complete search history.

(56) References Cited

U.S. PATENT DOCUMENTS

| | | | |
|---|---|---|---|
| 5,778,326 A * | 7/1998 | Moroto | B60W 10/08 701/22 |
| 6,314,347 B1 * | 11/2001 | Kuroda | B60W 20/00 701/22 |
| 6,445,982 B1 | 9/2002 | Swales et al. | |
| 6,487,477 B1 * | 11/2002 | Woestman | B60W 10/08 701/22 |
| 7,539,562 B2 | 5/2009 | Maguire et al. | |
| 7,849,944 B2 | 12/2010 | DeVault | |
| 8,116,973 B2 * | 2/2012 | Soma | B60W 10/06 701/22 |
| 2005/0228553 A1 | 10/2005 | Tryon | |
| 2007/0029121 A1 * | 2/2007 | Saitou et al. | 180/65.2 |
| 2007/0294026 A1 | 12/2007 | Schirmer | |
| 2008/0183348 A1 | 7/2008 | Arita et al. | |

(Continued)

FOREIGN PATENT DOCUMENTS

JP      2008-201165         9/2008  
JP    2008260361 A  *  10/2008

(Continued)

OTHER PUBLICATIONS

S. Maneyasu et al., Translation of JP 2007-143267, Jun. 7, 2007, Japanese Patent Application Publication.*

(Continued)

*Primary Examiner* — Rami Khatib  
*Assistant Examiner* — David Merlino  
(74) *Attorney, Agent, or Firm* — Snell & Wilmer LLP

(57) ABSTRACT

A system and method for optimizing a fuel efficiency of a hybrid vehicle by learning from a route history. The system may be a hybrid vehicle including an engine, a motor-generator, a battery, a battery module, a GPS unit, a memory, and a processor. The method may include detecting a current route of the hybrid vehicle, calculating a confidence value corresponding to a probability that the current route has a match in the route history, detecting a battery state of charge (SOC), determining a target SOC based on the confidence value and the route history, and adjusting an engine start/stop threshold and/or an engine power request to achieve the target SOC. They system may learn and improve fuel efficiency over successive trips along the route.

15 Claims, 3 Drawing Sheets

(56) References Cited

U.S. PATENT DOCUMENTS

| | | |
|---|---|---|
| 2009/0198398 A1 | 8/2009 | Yamada |
| 2010/0010733 A1 | 1/2010 | Krumm |
| 2010/0039067 A1 | 2/2010 | Hill et al. |
| 2010/0305799 A1* | 12/2010 | Yamada et al. ............... 701/22 |
| 2011/0022255 A1* | 1/2011 | Yamada et al. ............... 701/22 |
| 2011/0029168 A1 | 2/2011 | Talberg |
| 2011/0054768 A1 | 3/2011 | Sullivan |
| 2011/0153127 A1* | 6/2011 | Weslati ............ B60W 50/085 701/22 |
| 2011/0166740 A1 | 7/2011 | Desborough |
| 2011/0196555 A1 | 8/2011 | Hennings et al. |
| 2011/0251744 A1* | 10/2011 | Amano ............... B60W 10/06 701/22 |
| 2012/0010767 A1* | 1/2012 | Phillips ............ G01C 21/3469 701/22 |
| 2012/0010768 A1 | 1/2012 | Phillips et al. |
| 2012/0016576 A1 | 1/2012 | Huang et al. |
| 2012/0032637 A1 | 2/2012 | Kotooka et al. |
| 2012/0035795 A1 | 2/2012 | Yu et al. |
| 2012/0173061 A1 | 7/2012 | Hanley et al. |
| 2012/0197468 A1* | 8/2012 | Frederick ............ B60W 20/00 701/22 |
| 2013/0024055 A1* | 1/2013 | Hysko, Jr. ............ B60W 10/06 701/22 |
| 2013/0096745 A1* | 4/2013 | Hussain ............ B60W 20/104 701/22 |
| 2013/0116870 A1* | 5/2013 | Harty ............................ 701/22 |
| 2014/0052320 A1* | 2/2014 | Kamono ............ B60W 20/00 701/22 |
| 2014/0129070 A1* | 5/2014 | Lutz .................... B60W 20/00 701/22 |

FOREIGN PATENT DOCUMENTS

| | | |
|---|---|---|
| JP | 2008-279970 | 11/2008 |
| JP | 2008-308030 | 12/2008 |
| JP | 2009-101963 | 5/2009 |
| JP | 2010264791 A * | 11/2010 |
| JP | 2011211869 A * | 10/2011 |

OTHER PUBLICATIONS

Katsargyri, G.-e. et al.; "Optimally Controlling Hybrid Electric Vehicles Using path Forecasting"; American Control Conference; pp. 4613-4617; 2009.

Katsargyri, G.-e. et al.; "Path Dependent Receding Horizon Control Policies for Hybrid Electric Vehicles"; Control Applications, (CCA) & Intelligent Control, (ISIC) IEEE; pp. 607-612; 2009.

* cited by examiner

KNOWN ROUTE HV CONTROL COMPENSATION

BACKGROUND

1. Field

The present disclosure relates to a system and method for improving fuel efficiency of a hybrid vehicle by learning from a route history to determine the best energy use along a route, and more particularly to a system and method of adjusting an engine start/stop threshold to avoid inefficient energy use.

2. Description of the Related Art

With global energy prices rapidly increasing, hybrid vehicles, including plug-in hybrids, have become more popular due to their improved fuel efficiency over conventional combustion engine vehicles. The hybrid control logic monitors and regulates an engine and a motor-generator to efficiently utilize power from the engine or a battery. The hybrid control logic may monitor engine output and a battery state of charge (SOC) to optimize fuel efficiency. The hybrid control logic may switch operation between a charge sustain mode, wherein the engine provides power to the wheels and can also recharge the battery as needed, or a charge deplete mode, wherein the battery provides power to the wheels. The hybrid control logic achieves improved fuel efficiency over conventional vehicles by determining when to use power from the engine or from the battery.

However, the hybrid control logic may not utilize all available data from sensors on the hybrid vehicle. For example, hybrid vehicles may have a GPS module. The hybrid control logic does not use location information from the GPS module to further maximize fuel efficiency. The hybrid control logic also does not consider historical data to maximize fuel efficiency.

Thus, there is a need for a system and method directed to learning a route history to improve fuel efficiency.

SUMMARY

The present disclosure relates to a method and system for improving fuel efficiency of a hybrid vehicle by learning a route history. One aspect of the present disclosure is to identify a current route and then calculate the optimal fuel efficiency for the current route. Another aspect of the present disclosure is to improve the fuel efficiency with subsequent trips on the driven or selected route.

In one implementation, a system for optimizing the fuel efficiency of a hybrid vehicle includes an engine, a motor-generator, a battery connected to the motor-generator, and configured to be recharged by the engine through the motor-generator, a route identification module configured to detect a current route, a memory for storing a route history, and a processor configured to control the engine based on an engine start/stop threshold, to control the engine and the motor-generator to recharge the battery based on the engine start/stop threshold, to determine a state of charge (SOC) of the battery, to determine a target SOC based on comparing the current route with the route history, and to adjust the engine start/stop threshold based on the target SOC.

In another implementation, a hybrid vehicle includes an engine, a motor-generator, a battery connected to the motor-generator, and configured to be recharged by the engine through the motor-generator, a battery module configured to determine a state of charge (SOC) of the battery, a route identification module configured to detect a current route, a memory for storing a route history, and a hybrid controller configured to control the engine based on an engine start/stop threshold, to control the engine and the motor-generator to recharge the battery based on the engine start/stop threshold, to determine a target SOC based on comparing the current route with the route history, and to adjust the engine start/stop threshold based on the target SOC.

In yet another implementation, methods for optimizing fuel efficiency of a hybrid vehicle includes detecting a current route of the hybrid vehicle, calculating a confidence value corresponding to a probability that the current route matches a route in a route history, detecting a battery state of charge (SOC), determining a target SOC based on the confidence value and the route, and adjusting an engine start/stop threshold to achieve the target SOC.

BRIEF DESCRIPTION OF THE DRAWINGS

Other systems, methods, features, and advantages of the present disclosure will be or will become apparent to one with ordinary skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Apparatus, systems and methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

Figure 1:
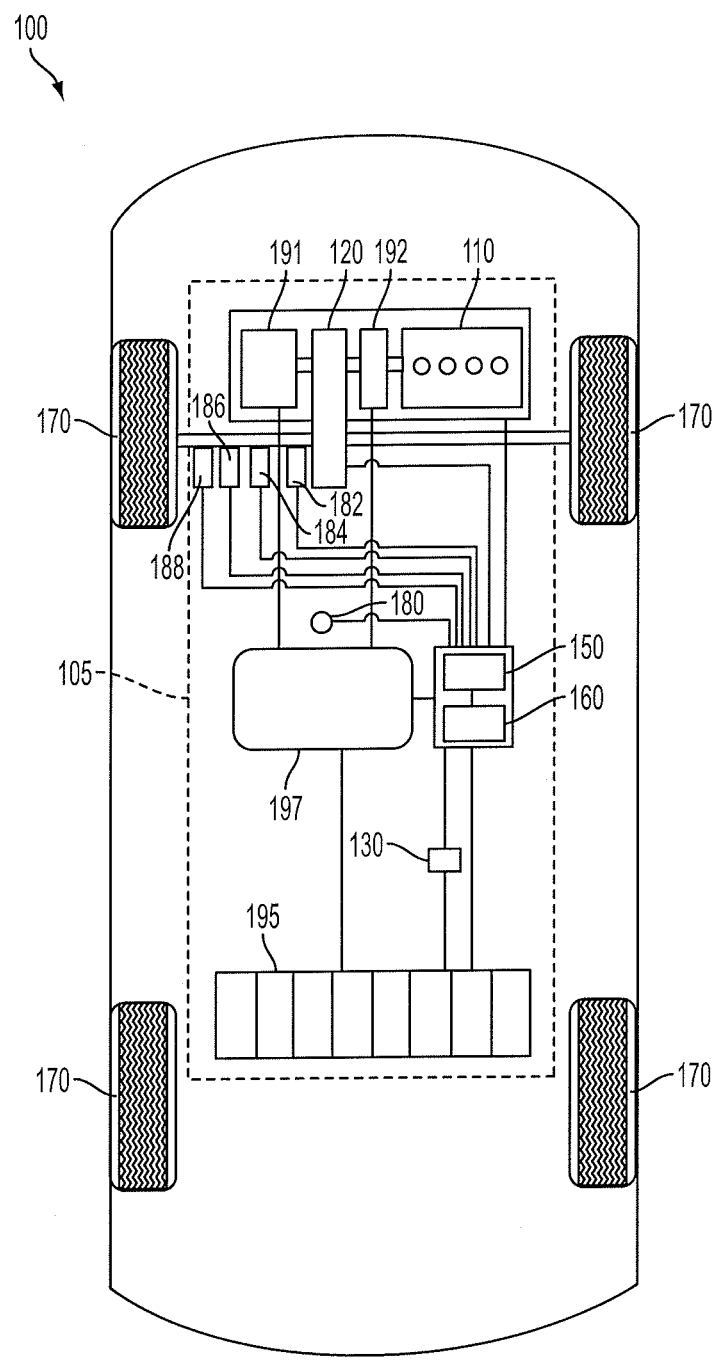
FIG. 1 is a block diagram of a hybrid vehicle including an engine and a transmission according to an implementation of the present disclosure.

In one implementation, the present disclosure includes a block diagram of a hybrid vehicle 100 as shown in FIG. 1. The hybrid vehicle 100 can include a drive force unit 105 and wheels 170. The drive force unit 105 may include an engine 110, an electric motor-generator 191, an electric motor-generator 192, a battery unit 195, a battery module 130, an inverter box 197, a transmission 120, a memory 160, a processor 150, a GPS unit 180, a speed sensor 182, an accelerometer 184, a grade sensor 186, and/or an altitude sensor 188.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The torque output by the engine 110 is received by the transmission 120. The motor-generators 191 and 192 can also output torque to the transmission 120. The engine 110 and the motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The motor-generators 191 and 192 can serve as motors which output torque in a drive mode, and can serve as generators to recharge the battery unit 195 in a regeneration mode. The electric power delivered from or to the motor-generators 191 and 192 passes through an inverter box 197 to the battery unit 195.

The GPS unit 180 is capable of determining a current location of the hybrid vehicle 100. The speed sensor 182 is connected to an output shaft of the transmission 120 to detect a speed input which is converted into a vehicle speed by the processor 150. The accelerometer 184 is connected to the body of the hybrid vehicle 100 to detect the actual acceleration or deceleration of the hybrid vehicle 100, which may be used in conjunction with the GPS unit 180 to improve the location/route information. The grade sensor 186 detects approximate grade information of a road currently driven on by the hybrid vehicle 100. The altitude sensor 188 estimates an approximate altitude of the hybrid vehicle 100. The altitude and grade information can further be used to improve the location/route information.

The transmission 120 is a transmission suitable for a hybrid vehicle. For example, the transmission 120 can be an ECVT (electrically controlled variable transmission), which is coupled to the engine 110 as well as the motor-generators 191 and 192. The transmission 120 can deliver torque output from a combination of the engine 110 and the motor-generators 191 and 192. The processor 150 controls the transmission 120, utilizing data stored in the memory 160 to determine the applied torque delivered to the wheels 170.

The battery unit 195 is a rechargeable battery that is capable of being utilized in a vehicle and may include a plurality of battery cells. The battery module 130 is capable of measuring parameters that are communicated to the processor 150 for determining an SOC of the battery unit 195 and/or an SOC of the hybrid vehicle 100. The battery module 130 may measure a voltage, a current, a temperature, charge acceptance, an internal resistance, self-discharges, magnetic properties, a state of health and/or other states or parameters of the battery unit 195. In other implementations, the SOC may be determined by coulomb counting, quantum mechanism, impedance spectroscopy or a hydrometer. In one implementation, the battery module 130 is a Battery Management System (BMS) which determines the SOC of the battery unit 195 using its sensors and its own processor. In another implementation, the hybrid vehicle 100 may not include a BMS, and the processor 150 may determine the SOC of the hybrid vehicle 100 using sensor data from the battery module 130.

In one implementation, the processor 150 may determine an SOC percentage or ratio of the vehicle based on an energy value stored in the battery unit 195 or the hybrid vehicle 100 relative to the current charging capacity of the battery unit 195 or the hybrid vehicle 100. The stored energy may be obtained through charging, regenerative braking or other means. In another implementation, the SOC may be determined based on the stored energy value relative to a reference capacity for the battery unit 195 or the hybrid vehicle 100. In yet another implementation, the SOC may be measured as a percentage or a ratio relative to another predetermined value associated with the battery unit 195 or the hybrid vehicle 100. Other systems or methods known in the art for determining an SOC percentage, value or number may be utilized without limiting the scope of the present disclosure.

Figure 2:
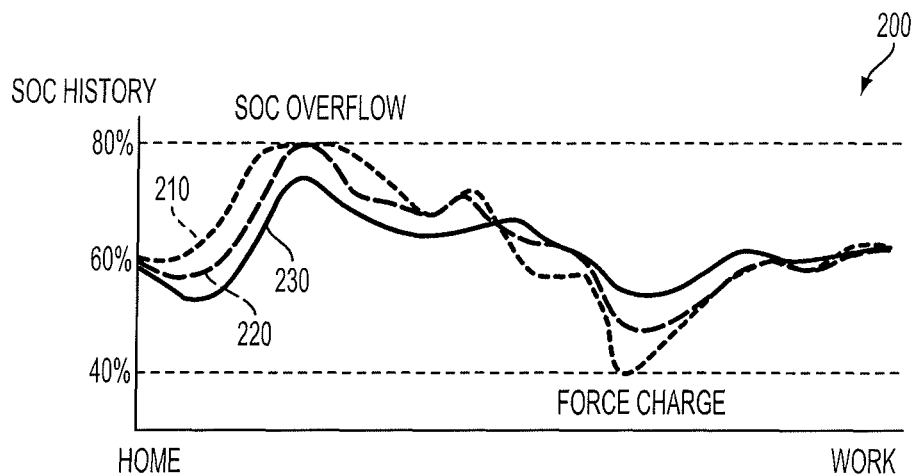
FIG. 2 is a graph showing the SOC levels during several trips on a route according to an implementation of the present disclosure.

FIG. 2 shows a graph that illustrates SOC levels while driving on a route. The route may be a commonly driven route. Plot 200 corresponds to a route from home to work, as shown along the x-axis. The SOC is represented by a percentage along the y-axis. In FIG. 2, a maximum SOC is 80%, and a minimum SOC is 40%. The maximum and minimum SOC percentages may be selected to maximize a battery life, but in alternative implementations may be different percentages.

Figure 3:
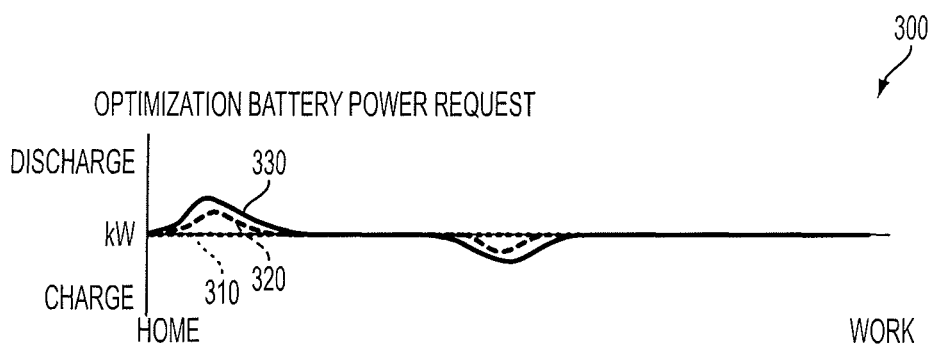
FIG. 3 is a graph showing an optimization adjustment during the route according to an implementation of the present disclosure.

FIG. 3 shows a graph that depicts optimization battery power requests while the engine 110 is running while driving on the route from home to work. The engine 110 provides power requested by the processor 150. To discharge the battery unit 195, the processor 150 requests less power from the engine 110 than the power request from the driver, shown on the positive y-axis of plot 300. The insufficient power is compensated by the battery unit 195, which discharges the battery unit 195. To charge the battery unit 195, the processor 150 requests more power from the engine 110 than the power request from the driver. The excess power charges the battery unit 195.

When the hybrid vehicle 100 first travels the route, the memory 160 may not have a route history which includes the route. The unoptimized SOC is shown by a first trip SOC curve 210 in FIG. 2. The corresponding battery power request during the first trip is shown by a first trip request curve 310 in FIG. 3. During the first trip SOC curve 210, a normal logic determines the target SOC, and accordingly controls when the engine 110 provides power or recharges the battery unit 195. As seen in the first trip request curve 310, the processor 150 does not make an optimization battery power request to discharge the battery unit 195. Thus, the SOC level reaches the maximum SOC, leading to an SOC overflow condition.

When an overflow condition is reached, the processor 150 determines that the battery unit 195 can no longer be safely recharged, disabling the regeneration mode of the motor-generators 191 and/or 192. However, the driving conditions allow for further recharging of the battery unit 195, such as during downhill driving. Thus, during the overflow condition, the hybrid vehicle 100 wastes electric energy which potentially could have recharged the battery unit 195. In other words, if the hybrid vehicle 100 anticipated the overflow condition, having a lower SOC before the overflow would allow the hybrid vehicle 100 to continue charging rather than shut off the regeneration mode. More efficient use of this energy increases fuel efficiency.

Later in the route, the SOC hits the minimum SOC. When this occurs, the processor 150 determines a force charge is necessary. Because the SOC is too low, the processor 150 starts the engine 110 to charge the battery unit 195 through the motor-generators 191 and 192. However, the force charge is inefficient because the engine 110 must start, and use fuel, in order to charge the battery unit 195, even if the driver is requesting little or no power. The processor 150 did not make an optimization battery power request, as seen in the first trip request curve 310. If the processor 150 could anticipate the force charge condition, the force charge can be avoided, increasing fuel efficiency.

The processor 150 stores the route in the route history stored in a route identification module. The route identification module is the GPS unit 180. The route identification module may be integrated with the processor 150 and the memory 160 such that the route history is stored in the memory 160. In alternative implementations, the route identification module may have its own processor and memory. In other implementations, the route history may be stored in a wirelessly connected storage medium or cloud, other onboard memory, removable media, etc. The route includes location information with corresponding SOC levels. The location information may be extracted from the GPS unit 180. The route may include only critical events, such as the overflow and force charge conditions and system losses, or may include additional samples taken along the route. The route may further include information such as timestamps, time durations, distances, etc. The route may also be further enhanced through information from the GPS unit 180, the speed sensor 182, the accelerometer 184, the grade sensor 186, and/or the altitude sensor 188.

When available, the route history may also store conditions which may lead to an overflow or a force charge. For example, a long downhill portion, determined by a grade or altitude, may be the cause of the overflow, and traffic congestion or other traffic conditions may be the cause of the force charge. These conditions may also help identify the route, when matching the current route with one in the route history. The conditions may provide more data for statistical analysis, such as calculating performance. The processor 150 can also utilize these conditions as feed forward adjustments to further adjust the engine start/stop threshold and/or the engine power request. However, these conditions are not necessary for the route history. By storing the overflow or force charges, the processor 150 has enough information to anticipate and prevent such conditions.

Second trip SOC curve 220 depicts the SOC percentages during a second trip along the route. Since the route is now stored in a route history, the route identification module can identify the route such that the processor 150 can manage the SOC levels more efficiently. The processor 150 can further anticipate and minimize system losses by analyzing the route history. The route history may not require additional information about the route, such as geographical information, but may be augmented by the additional information when available.

By analyzing the route history, the processor 150 can anticipate the overflow condition. The processor 150 may determine whether a lower target SOC is desired, and in turn may raise an engine start/stop threshold. The engine start/stop threshold may be an Electric Vehicle (EV) threshold, which determines when the hybrid vehicle 100 shuts off the engine 110 and drives using battery power. With the adjusted engine start/stop threshold, the processor 150 shuts off the engine 110 sooner so that the hybrid vehicle 100 uses more battery power before the overflow condition. The processor 150 may also adjust the power requested from the engine 110 and the battery unit 195 to discharge the battery unit 195. For example, if the driver requests 100 kW, the processor 150 can request only 80 kW from the engine 110, such that the battery unit 195 provides the remaining 20 kW to drain it.

As seen in the second trip request curve 320 in FIG. 3, the processor 150 requests a discharge in anticipation of the overflow. Thus, in FIG. 2, the second trip SOC curve 220 maintains a lower SOC, which corresponds to a lower target SOC, than the first trip SOC curve 210 before the overflow. Because the SOC is lower, the battery unit 195 requires more charging, resulting in a shorter overflow condition than during the first trip. The shorter overflow translates into more of the available electrical energy being utilized to charge the battery, rather than being wasted.

Later in the route, the second trip SOC curve 220 avoids the force charge condition. As the hybrid vehicle 100 approaches the location of the force charge condition, the processor 150 may also determine whether a higher target SOC is desired, and can accordingly adjust the engine start/stop threshold. To avoid the battery unit 195 from being depleted, the processor 150 lowers the engine start/stop threshold. With the lowered engine start/stop threshold, the engine 110 turns on sooner, which prevents the battery unit 195 from discharging as quickly as during the first trip. In addition, the processor 150 requests a charge before reaching the force charge, as indicated in the second trip request curve 320. Thus, the second trip SOC curve 220 avoids the force charge condition entirely.

The processor 150 updates the route history with information from the second trip SOC curve 220. The processor 150 may store the target SOCs and may store additional analysis of fuel efficiency along the route. With subsequent trips along the route, the processor 150 may accordingly update the route history in order to improve fuel efficiency with each trip along the route. The hybrid vehicle 100 thus learns the route, and the most fuel efficient way to traverse the route.

The third trip SOC curve 230 shows an improvement over the second trip SOC curve 220. In the third trip SOC curve 230, the target SOC before the overflow condition is even lower than in the second trip SOC curve 220. By the third trip along the route, the hybrid vehicle 100 has learned to altogether avoid the overflow condition, by requesting a sufficient discharge beforehand as seen in the third trip request curve 330. In addition, in the third trip SOC curve 230, the SOC does not fall to the force charge condition, improving upon the second trip SOC curve 220. The processor 150 requests a sufficient charge before reaching the force charge condition, shown in the third trip request curve 330. The fuel efficiency may be further improved on subsequent trips.

Figure 4:
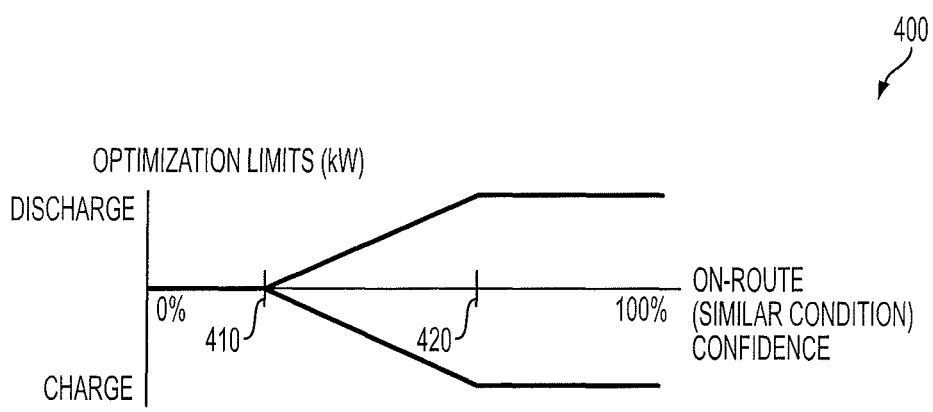
FIG. 4 is a graph showing how a confidence value affects adjustments according to an implementation of the present disclosure.

FIG. 4 depicts a graph 400 showing how a confidence value may be used to scale the power adjustments. Utilizing location information from the GPS unit 180, the processor 150 compares the current location with routes stored in the route history. The processor 150 may further utilize updated location information as the hybrid vehicle 100 moves, to further determine a route from the route history that matches the current route. The processor 150 calculates a confidence value that indicates how close a match the current route is with a route in the route history. Alternatively, the GPS unit 180 may determine the confidence value and send the confidence value to the processor 150. The confidence value may correspond to a probability that the current route matches with a route in the route history. Based on the confidence value, the hybrid vehicle 100 may request confirmation from the driver that the current route matches the selected route.

The confidence value may be used by the processor 150 to scale the adjustments to the target SOC, the engine start/stop thresholds, and the engine power requests. The confidence value may be used as a continuous multiplier, or may correspond to discrete multipliers. In graph 400 of FIG. 4, the confidence value is used to cap the actual power, in kW, requested to charge or discharge from the engine power request.

A confidence minimum threshold 410 and a confidence maximum threshold 420 delimit a range of how the confidence value affects the power requests. Below the confidence minimum threshold 410, the adjustments may be disabled. The confidence minimum threshold 410 may be 40%, or any other suitable threshold.

Between the confidence minimum threshold 410 and the confidence maximum threshold 420, the adjustment limits may increase as the confidence value increases. At the confidence maximum threshold 420, the adjustment limit reaches an upper cap, such that all adjustments at the confidence maximum threshold 420 and higher confidence values are capped. The confidence maximum threshold 420 may be 80%, or any other suitable threshold. In addition, the hybrid vehicle 100 may request route confirmation if the confidence value is below the confidence maximum threshold 420.

The adjustments by the processor 150 may be improved with additional information about the route. An elevation detected by the altitude sensor 188 may be used to determine if the route travels uphill or downhill, and to accordingly adjust the engine start/stop threshold.

Figure 5:
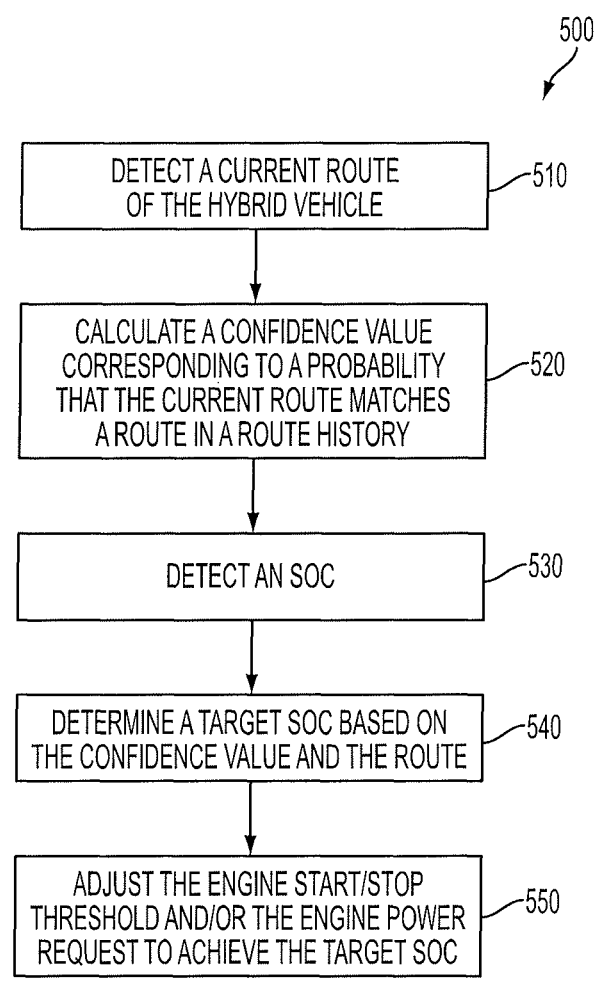
FIG. 5 is a flowchart illustrating control logic for known route fuel efficiency according to an implementation of the present disclosure.

FIG. 5 presents a flowchart 500 of a method for optimizing a fuel efficiency of a hybrid vehicle based on a route history, which may be performed by the processor 150. At 510, the processor 150 detects a current route of the hybrid vehicle 100. At 520, the processor 150 calculates a confidence value. The confidence value corresponds to a probability that the current route matches a route in the route history. At 530, the processor 150 detects an SOC through the battery module 130. At 540, the processor 150 determines a target SOC based on the confidence value and the route. At 550, the processor 150 adjusts the engine start/stop threshold and/or the engine power request to achieve the target SOC.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for optimizing fuel efficiency of a hybrid vehicle comprising:
 a motor-generator;
 a battery connected to the motor-generator and having a state of charge (SOC);
 an engine coupled to the motor-generator and configured to recharge the battery via the motor-generator;
 a memory configured to store a route history including a location at which the SOC of the battery reaches a first overflow condition that corresponds to the SOC of the battery being at or above an upper threshold or reaches a first force charge condition that corresponds to the SOC of the battery being at or below a lower threshold;
 a route identification module configured to detect a current route and calculate a confidence value corresponding to a probability of the current route having a match in the route history; and
 a processor configured to:
  control the engine to recharge the battery based on an engine power request,
  determine the SOC of the battery,
  determine a target SOC that will reduce the likelihood of a second overflow condition or a second force charge condition based on comparing the current route with the route history, the target SOC being less than the upper threshold and greater than the lower threshold,
  adjust the engine power request based on the target SOC and the confidence value in an attempt to prevent the SOC of the battery from reaching the upper threshold or the lower threshold, wherein an amount that the processor may adjust the engine power request may continuously or incrementally increase as the confidence value increases between a minimum confidence value and a maximum confidence value, and
  update the current route in the route history by storing the target SOC.

2. The system of claim 1, wherein the amount that the processor may adjust the engine power request is zero when the confidence value is below the minimum confidence value.

3. The system of claim 1, wherein updating the current route in the route history further includes storing a current location and the SOC of the battery.

4. The system of claim 1, wherein the processor is further configured to adjust the engine power request to avoid an SOC overflow.

5. The system of claim 1, wherein the processor is further configured to adjust the engine power request to avoid a force charge.

6. A hybrid vehicle comprising:
a motor-generator;
a battery connected to the motor-generator and having a state of charge (SOC);
an engine coupled to the motor-generator and configured to recharge the battery via the motor-generator;
a battery module configured to determine the SOC of the battery;
a memory configured to store a route history including a location at which the SOC of the battery reaches a first overflow condition that corresponds to the SOC of the battery being at or above an upper threshold or reaches a first force charge condition that corresponds to the SOC of the battery being at or below a lower threshold;
a route identification module configured to detect a current route and calculate a confidence value corresponding to a probability of the current route having a matching route in the route history; and
a processor configured to:
control the engine to recharge the battery based on an engine power request,
determine a target SOC that will reduce the likelihood of a second overflow condition or a second force charge condition based on comparing the current route with the route history, the target SOC being less than the upper threshold and greater than the lower threshold,
adjust the engine power request based on the target SOC and the confidence value in an attempt to prevent the SOC of the battery from reaching the upper threshold or the lower threshold, wherein an amount that the processor may adjust the engine power request may continuously or incrementally increase as the confidence value increases between a minimum confidence value and a maximum confidence value, and
update the current route in the route history by storing the target SOC.

7. The hybrid vehicle of claim 6, wherein updating the current route in the route history further includes storing a current location and the SOC of the battery.

8. The hybrid vehicle of claim 6, wherein the processor is further configured to adjust the engine power request based on a feed forward adjustment.

9. The hybrid vehicle of claim 8, wherein the feed forward adjustment is based on a current grade of a road being traveled upon by the hybrid vehicle.

10. The hybrid vehicle of claim 8, wherein the feed forward adjustment is based on a current traffic condition.

11. The hybrid vehicle of claim 6, wherein the route identification module is further configured to request, from a user, a confirmation that the current route matches the matching route.

12. A method for optimizing fuel efficiency of a hybrid vehicle comprising:
detecting, by a battery module, a state of charge (SOC) of a battery;
storing, in a memory, a route history including a location at which the SOC of the battery reaches a first overflow condition that corresponds to the SOC of the battery being at or above an upper threshold or reaches a first force charge condition that corresponds to the SOC of the battery being at or below a lower threshold;
detecting, by a route identification module, a current route of the hybrid vehicle;
calculating, by the route identification module, a confidence value corresponding to a probability that the current route matches a route in the route history;
determining, by a processor, a target SOC that will reduce the likelihood of a second overflow condition or a second force charge condition based on the confidence value and the current route, the target SOC being less than the upper threshold and greater than the lower threshold;
adjusting, using the processor, a threshold of an engine indicating when the processor will cause the engine to start or stop in an attempt to prevent the SOC of the battery from reaching the upper threshold or the lower threshold, wherein an amount that the processor may adjust the threshold of the engine may continuously or incrementally increase as the confidence value increases between a minimum confidence value and a maximum confidence value; and
updating, by the processor, the current route in the route history by storing the target SOC.

13. The method of claim 12, further comprising adjusting, using the processor, a power request of the engine to achieve the target SOC based on the confidence value.

14. The method of claim 12, wherein updating the current route in the route history further includes storing a current location and the SOC of the battery.

15. The method of claim 12, wherein the route history further includes at least one of an altitude, a grade of a road, a vehicle speed, or a vehicle acceleration.

* * * * *